C. LABS.
LISTER.
APPLICATION FILED JUNE 30, 1915.
1,221,192.   Patented Apr. 3, 1917.
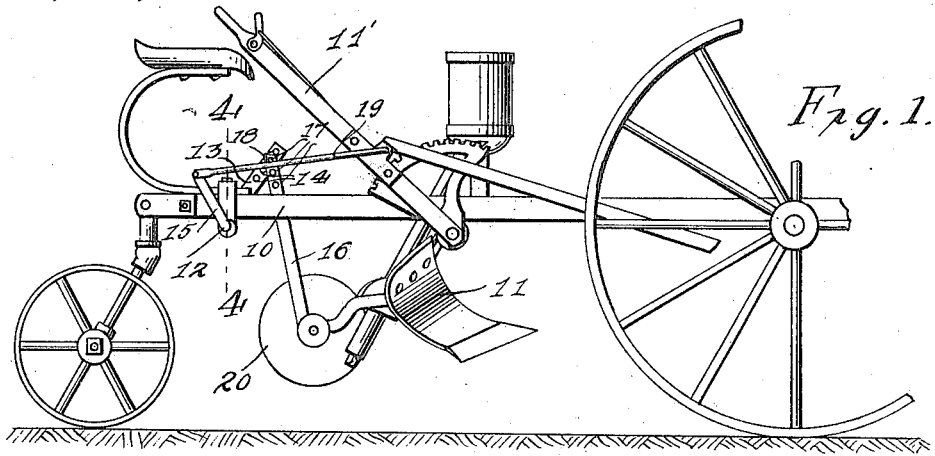
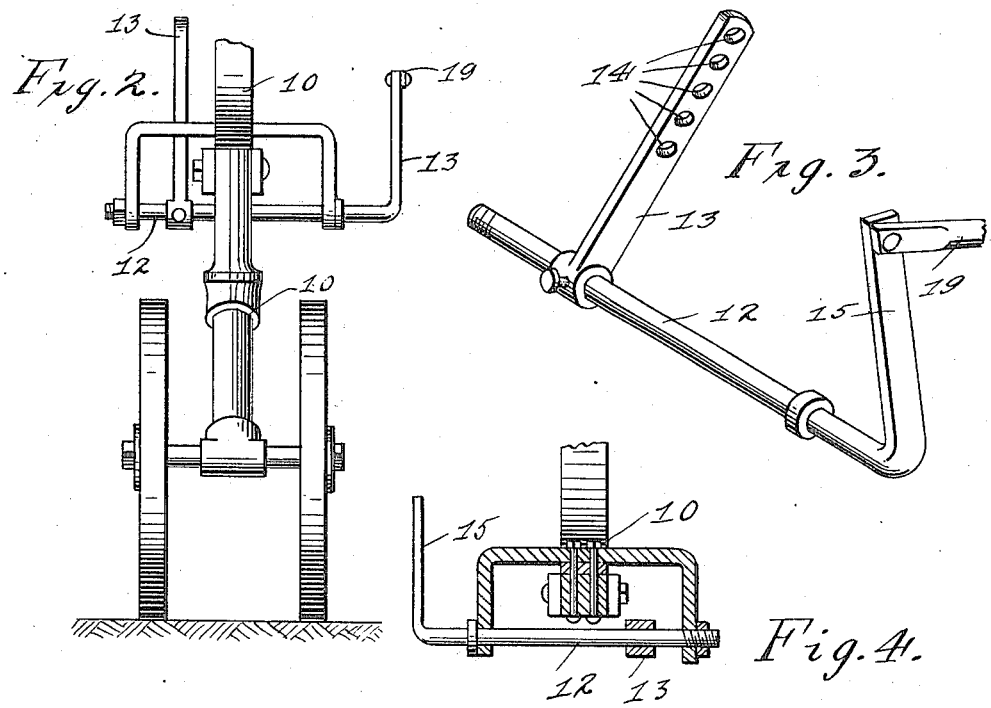
Witnesses
J. H. Hauke
H. M. Test
Inventor
C. Labs.
By Chandler Chandler
Attorneys.

UNITED STATES PATENT OFFICE.

CARL LABS, OF AMHERST, NEBRASKA.

LISTER.

1,221,192.  Specification of Letters Patent.  Patented Apr. 3, 1917.

Application filed June 30, 1915. Serial No. 37,398.

*To all whom it may concern:*

Be it known that I, CARL LABS, a citizen of the United States, residing at Amherst, in the county of Buffalo, State of Nebraska, have invented certain new and useful Improvements in Listers; and I do hereby declare the following to be a full, clear, and exact description of the invention, such as will enable others skilled in the art to which it appertains to make and use the same.

This invention relates to improvements in listers.

The principal object of the invention is to provide a corn covering device for a lister which is capable of being quickly and easily thrown into and out of operation simultaneously with the furrow opener and seed depositing means.

Another object is to provide a corn covering device which can be adjusted to cover the corn to any depth desired.

Other objects and advantages will be apparent from the following description when taken in connection with the accompanying drawing.

In the drawing:

Figure 1 is side elevation of my invention,

Fig. 2 is a rear elevation,

Fig. 3 is a detail perspective view of a rock shaft used in connection with the attachment.

Fig. 4 is a transverse section on the line 4—4 of Fig. 1.

Referring particularly to the accompanying drawing, 10 represents the rear portion of the frame of a lister which is equipped with the usual furrow opener 11, and the lever 11' for raising and lowering said furrow opener. In the rear of the furrow opener and mounted on the frame is a transverse shaft 12 near one end of which is mounted a crank arm 13 formed with a plurality of perforations 14. On the other end of the shaft is a second crank arm 15 which extends radially from the shaft at an angle to the first-named arm. A depending link 16 is provided with a plurality of openings 17 and is adjustably connected to the arm 13 by means of the bolt 18.

Connecting the arm 15 with the lever 11' is a link 19. It will thus be seen that when the lever 11' is swung on its pivot to raise and lower the furrow opener 11 motion will be communicated to the shaft 12 by means of the link 19, thereby raising and lowering the link 17. The lower end of this link carries a covering disk 20 which, as will be readily understood is raised and lowered with the said link. By means of the openings of the crank arm 13 and the link 17 the disk 20 can be raised and lowered so as to dig into the ground to any depth desired, thus regulating the depth of the furrow.

It will be noted that the arm 13 is adjustable on the shaft 12, and by this arrangement it is possible to move the covering disk closer to or farther away from the line of travel of the furrow opener, thereby regulating the width of the furrow and of the hill formed by the disk.

What is claimed is:

An attachment for a lister provided with a covering disk, consisting of an inverted U-shaped bracket arranged to be secured to the central longitudinal member of the lister frame and to have the extremities of the legs extend below said member, a transverse shaft journaled in the ends of said legs, a crank arm on one end of the shaft, an arm carried adjacent the other end of the shaft, a depending link adjustably connected to the second arm and arranged for connection to the disk, said link and second arm being provided with means whereby different points of the link may be connected to different points along the length of the second arm, and a second link pivotally connected to the crank arm and having its forward end adapted for connection to the furrow opener raising lever of the lifter.

In testimony whereof, I affix my signature, in the presence of two witnesses.

CARL LABS.

Witnesses:
J. V. COLBERT,
S. E. SMITH.

Copies of this patent may be obtained for five cents each, by addressing the "Commissioner of Patents, Washington, D. C."